United States Patent [19]

Shekleton et al.

[11] Patent Number: 5,027,603
[45] Date of Patent: Jul. 2, 1991

[54] TURBINE ENGINE WITH START INJECTOR

[75] Inventors: Jack R. Shekleton, San Diego; Steven A. Sachrison, La Jolla; Michael W. Sledd, Vista, all of Calif.

[73] Assignee: Sundstrand Corporation, Rockford, Ill.

[21] Appl. No.: 583,007

[22] Filed: Sep. 14, 1990

Related U.S. Application Data

[63] Continuation of Ser. No. 291,057, Dec. 28, 1988, abandoned.

[51] Int. Cl.$^5$ ................................................. F02C 3/00
[52] U.S. Cl. ..................................... 60/743; 60/39.36; 60/39.826
[58] Field of Search ............ 60/737, 738, 743, 39.826, 60/740; 239/424, 533.15; 123/531

[56] References Cited

U.S. PATENT DOCUMENTS

| | | | |
|---|---|---|---|
| 2,706,520 | 4/1955 | Chandler | 60/39.36 |
| 3,306,333 | 2/1967 | Mock | 60/39.827 |
| 3,353,351 | 11/1967 | Bill et al. | 60/743 |
| 3,355,884 | 12/1967 | Poucher et al. | 60/743 |
| 3,613,360 | 10/1969 | Howes | 60/39.36 |
| 4,798,190 | 1/1989 | Vaznaian et al. | 123/531 |
| 4,891,936 | 1/1990 | Shekleton et al. | 60/760 |

Primary Examiner—Louis J. Casaregola
Assistant Examiner—Timothy S. Thorpe
Attorney, Agent, or Firm—Wood, Phillips, Mason, Recktenwald & VanSanten

[57] ABSTRACT

Improved fuel atomization for turbine engines operating at low fuel flows and at high altitudes is accomplished in an engine having an annular combustor 26 by utilizing start fuel injectors 46 provided with discharge orifices 56 and planar impingement surfaces 60 within the path of fuel discharged from the orifices 56 to provide flat sprays 62 that are generally tangential to the annular combustor 26 so as to be intercepted by an igniter 70 in a radial wall 34 of the combustor 26.

11 Claims, 1 Drawing Sheet

TURBINE ENGINE WITH START INJECTOR

This application is a continuation, of U.S. application Ser. No. 291,057, filed Dec. 28, 1989, now abandoned.

FIELD OF THE INVENTION

This invention relates to gas turbine engines, and more particularly, to gas turbine engines provided with inexpensive, high efficiency fuel atomizing start injectors to enhance reliability.

BACKGROUND OF THE INVENTION

Gas turbine engines often include so-called "start" injectors that are used when initiating operation of the turbine. In relatively small turbine engines in airborne environments, fuel flows at high altitudes during starting are frequently quite low. Consequently, with conventional start injectors, high fuel pressures are required to achieve pressure atomization of the fuel, particularly since air blast atomization is not a viable alternative during start up when the turbine is rotating at a minor per cent of its rated speed. At the same time, at such low speeds, it is difficult with available fuel pumps to generate the necessary fuel pressure.

To meet these difficulties, conventional start injectors have extremely small orifices to provide the desired atomization making them precision formed parts. They are thus costly to manufacture. At the same time, because of the very small orifices employed, they are prone to plugging, a factor that clearly detracts from reliability. In addition, the effects of the relatively small scale of these engines and their components reduce fuel atomization effectiveness.

The present invention is directed to overcoming one or more of the above problems.

SUMMARY OF THE INVENTION

It is the principal object of the invention to provide a new and improved turbine engine. More specifically, it is an object of the invention to provide a new and improved fuel injection system for a turbine engine which provides excellent fuel atomization, adequate to provide reliable high altitude starts and which may be manufactured inexpensively. It is further object of the invention to provide ignition means positioned to intercept spray from a start fuel injector.

An exemplary embodiment of the invention achieves the foregoing objects in a gas turbine engine including a rotary compressor and a turbine wheel coupled to the compressor to drive the same. An annular nozzle is proximate the turbine wheel for directing gases of combustion at the turbine wheel and an annular combustor defining an annular combustion space is disposed about the turbine wheel and is in fluid communication with both the compressor and the nozzle. The combustor, which includes a radial wall having at least one igniter mounted therein, receives fuel from a source and air from the compressor and combusts the same to generate the gases of combustion.

At least one start fuel injector is provided for injecting fuel from the source into the combustor and includes at least one discharge orifice along with means defining an impingement surface within the combustor in the path of fuel discharged from the orifice. The impingement surface is located so as to cause fuel discharged from the orifice to be in a spray generally tangential to the combustion space. In a preferred embodiment, the orifice opens generally radially inwardly, the impingement surface is generally planar and at an angle to the orifice to produce a flat spray, and the igniter is positioned to intercept the spray from the start fuel injector.

In a highly preferred embodiment, the turbine wheel defines a rotational axis and the planar impingement surface is parallel to the axis.

The invention contemplates that a plurality of such igniters and start injectors may be provided in the combustor at circumferentially spaced locations.

In a preferred embodiment, the impingement surface is defined by a finger within the annular combustor. In a highly preferred embodiment, each start fuel injector employed includes a barrel terminating in the discharge orifice and the finger is mounted on the barrel at an acute angle with respect thereto and in spaced relation to the discharge orifice with a tangential fuel/air injector being disposed intermediate the start fuel injector and the igniter. When used as a start fuel injector, the discharge orifice is preferably a short orifice.

Other objects, advantages and features will become apparent from the following specification taken in conjunction with the accompanying drawings.

DESCRIPTION OF THE PREFERRED EMBODIMENT

Figure 1:
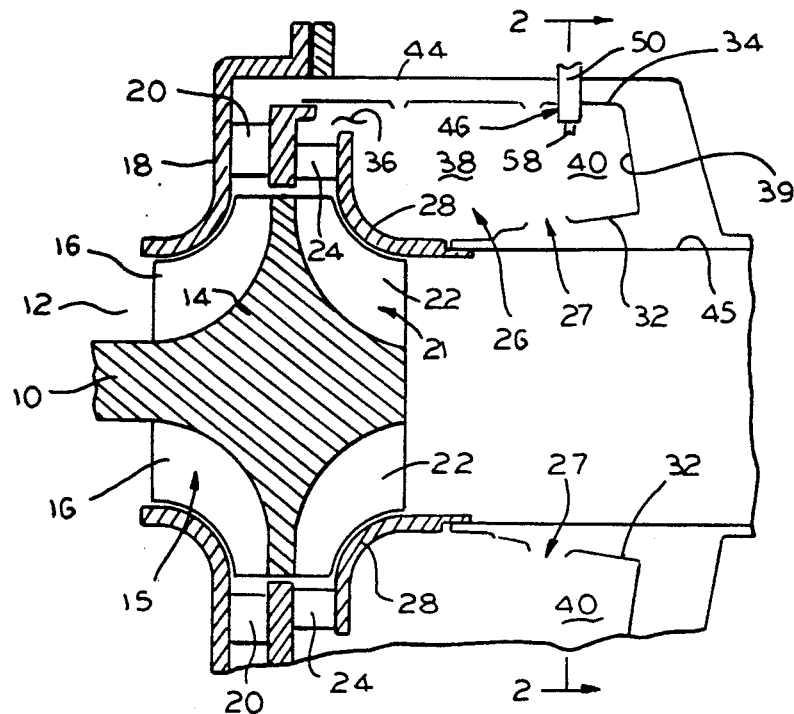
FIG. 1 is a somewhat schematic, sectional view of a turbine engine embodying the invention.

An exemplary embodiment of a gas turbine made according to the invention is illustrated in the drawings in the form of a radial flow, air breathing gas turbine. However, the invention is not limited to radial flow turbines and may have applicability to any form of air breathing turbine having an annular combustor.

As will be appreciated by referring to commonly owned, copending U.S. patent application, Ser. No. 283,080, filed Dec. 12, 1988, the turbine includes a rotary shaft 10 journaled by bearings (not shown). As shown in FIG. 1, the turbine is configured such that adjacent one end of the shaft 10 is an inlet area 12. The shaft 10 mounts a rotor, generally designated 14, which may be of conventional construction. Still referring to FIG. 1, the turbine also includes a compressor section, generally designated 15, having a plurality of compressor blades 16 adjacent the inlet 12. A compressor shroud 18 is provided adjacent the compressor blades 16 and just radially outwardly of the radially outer extremities of the compressor blades 16 is a conventional diffuser 20.

Oppositely of the compressor blades 16, the rotor 14 includes a turbine wheel, generally designated 21, including a plurality of turbine blades 22. As shown in FIG. 1, an annular nozzle 24 is provided just radially outwardly of the turbine blades 22 to receive hot gases of combustion along with a dilution air from an annular combustor, generally designated 26. The compressor 15 including the blades 16, the shroud 18, and the diffuser 20 delivers compressed air to the annular combustor 26, and via dilution air passages 27, to the nozzle 24 along with the gases of combustion. Still referring to FIG. 1, the hot gases of combustion from the combustor 26 are directed via the nozzle 24 against the blades 22 to cause rotation of the rotor 14 and thus the shaft 10. Of course, it will be appreciated that the shaft 10 may be coupled to some sort of apparatus requiring the performance of useful work.

A turbine blade shroud 28 is interfitted with the combustor 26 to close off the flow path from the nozzle 24 and confine the expanding gas to the area of the turbine blades 22. The combustor 26 has a generally cylindrical inner wall 32, and a generally cylindrical outer wall 34. The two are generally concentric with each other and with the rotational axis of the shaft 10 and merge to a necked down area 36 which extends to the nozzle 24 and serves as an outlet from an interior annulus 38 defined by the space between the walls 32 and 34 of the combustor 26. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor includes a primary combustion zone 40 in which the burning of fuel primarily occurs. The primary combustion zone 40 is an annulus or annular space defined by the generally radial inner wall 32, the generally radial outer wall 34, and the radial wall 39 while other combustion may, in some instances, occur downstream from the primary combustion zone 40 in the direction of the outlet 36. As mentioned earlier, provision is made for the injection of dilution air through the passages 27 into the combustor 26 to cool the gases of combustion to a temperature suitable for application to the turbine blades 22 via the nozzle 24.

A further annular wall 44 is generally concentric to the walls 32 and 34 and is located radially outward of the latter. Similarly, an inner annular wall 45 inside the wall 32 is provided and together with the wall 44 provides a plenum surrounding the combustor 26. The wall 44 extends to the outlet of the diffuser 20 and thus serves to contain and direct compressed air from the compressor system to the combustor 26.

Figure 2:
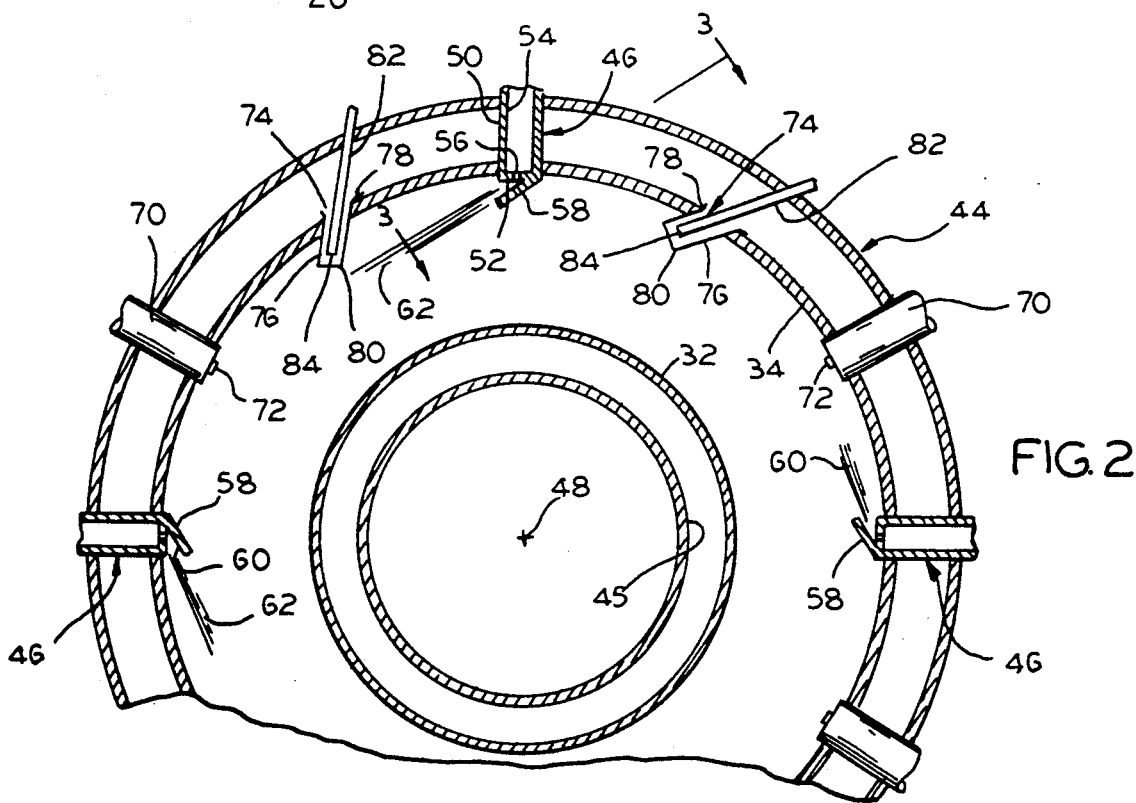
FIG. 2 is a sectional view taken approximately along the line 2—2 of FIG. 1.

As seen in FIGS. 1 and 2, start fuel injectors, generally designated 46, extend through the walls 44 and 34 generally radially, that is, toward the axis 48 of rotation of the rotor 14. Preferably, there are a plurality of the start injectors 46, each of which includes an elongated barrel 50 terminating in a capped end 52. While not shown, it will be appreciated that the barrel 50 of each start injector 46 may be connected conventionally to a fuel source for providing fuel under pressure to the hollow interior 54 of the barrel 50.

For each start injector 46, the end cap 52 includes a discharge orifice 56 in fluid communication with the hollow interior 54 through which the start injector 46 discharges radially inwardly toward the axis 48. It should also be apparent the discharge orifice 56 of each start injector 46 is a so-called "short" orifice having a length on the same order as its width. Where the injector 46 is a start fuel injector, this configuration is preferable since it will accommodate minimum fuel pressure while maximizing atomization that is obtainable for a given pressure.

Secured to each barrel 50 at a location within the combustor 26 is a finger 58 having a planar impingement surface 60 located in the path of fuel being discharged through the orifice 56. The finger 58 is mounted to the end of the barrel 50 at an acute angle thereto. With this arrangement, the planar surface 60 will preferably be generally tangential to the combustion space 40, which is to say the planar surface 60 will be parallel to the rotational axis 48.

Figure 3:
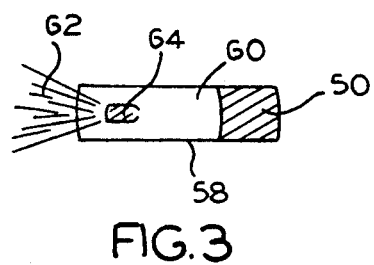
FIG. 3 is an enlarged, fragmentary sectional view taken approximately along the line 3—3 in FIG. 2.

As can be seen from FIG. 2, fuel being discharged through the orifice 56 will impinge upon the surface 60 and be discharged in a flat spray 62 generally midway between the walls 32 and 34. As can be seen in FIG. 3, the flat spray 62 becomes fan shaped as well when a generally cylindrical column 64 of fuel passing through the orifice 56 impinges upon the surface 60.

As will be appreciated by referring to FIG. 2, an igniter 70 having an ignition tip 72 is employed in the combustor annulus 38. Desirably, the tip 72 is in the path of the flat, diverging spray 62 from one of the start fuel injectors 46 to assure reliable ignition. In other words, the igniter 70 is positioned so as to intercept the spray of fuel from one of the start fuel injectors 46.

Still referring to FIG. 2, it will be seen that a plurality of circumferentially spaced start fuel injectors 46 and igniters 70 are preferably provided. The igniters 70 are mounted in a radial wall of the combustor 26, e.g., the outer wall 34, as are the start fuel injectors 46. In addition, any desired number of tangential fuel/air injectors 74 are disposed intermediate the start fuel injectors 46 and igniters 70.

As with the start fuel injectors 46 and igniters 70, the tangential fuel/air injectors 74 are also mounted in the outer radial wall 34. The tangential fuel/air injectors 74 direct a spray of fuel and air generally tangentially of the combustion space 40 during normal operation of the gas turbine engine which fuel/air mixture is ignited by the tips 72 of the igniters 70. As will be appreciated, the tangential fuel/air injectors 74 produce a circumferential swirl of fuel and air in the combustion space 40 in conventional fashion.

The tangential fuel/air injectors 74 typically will each include an outer tube or sleeve 76 having an outer end 78 opening to the space between the walls 34 and 44. The tubes 76 are aimed tangentially to the combustion space 40 with their inner ends 80 therein and thus serve to inject combustion air form the compressor section 15 into the combustor 26. Within each tube 76 is a small diameter tube 82 having an inner, discharge nozzle end 84 which is directed tangentially to the combustion space 40. A manifold (not shown) connects the tubes 82 to a source of fuel under pressure such that fuel is injected tangentially into the combustion space 40 through the tubes 82 and is atomized by the air flowing through the corresponding surrounding tube 76. The thus defined fuel/air injectors 74 accordingly serve as tangentially directed, main fuel injectors.

Because the invention employs impingement pressure atomization as opposed to more conventional swirl pressure atomization as the primary means of atomization, the difficulties associated with generating adequate pressure at low fuel flows sufficient to achieve good atomization at low rotational speed are minimized. Moreover, by reason of the planar surface 60 of the finger 58 which is disposed to deflect the fuel tangentially, very efficient fuel atomization is provided and viscous losses, normally considerable in small scale conventional swirl pressure atomizing injectors, are much reduced because of the absence of swirl of fuel.

It will also be appreciated that injectors 46 made according to the invention need not be made with the same precision as injectors heretofore used because, unlike some precisely formed orifice or the like, the impingement surface 60 is the instrumentality that provides the desired atomization.

While in the foregoing there has been set forth a preferred embodiment of the invention, it will be appreciated that the invention is only to be limited by the true spirit and scope of the appended claims.

I claim:

1. A gas turbine engine, comprising:
   a rotary compressor;
   a turbine wheel coupled to said compressor for driven movement thereof;
   an annular nozzle proximate said turbine wheel for directing gases of combustion thereat;
   an annular combustor defining an annular combustion space disposed about said turbine wheel and in fluid communication with both said compressor and said nozzle, said combustor including a cylindrical wall having at least one igniter mounted therein, said combustor receiving fuel from a source and air from said compressor and combusting fuel and air in said combustion space to generate said gases of combustion; and
   at least one impingement fuel injector for injecting fuel from said source into said combustor, said impingement fuel injector comprising at least one generally radially opening discharge orifice and an impingement surface within said combustor in the path of fuel discharged from said orifice and at an angle thereto so as to produce a flat, diverging spray of fuel in a direction generally circumferentially about and tangential to said combustion space, said igniter being positioned in said cylindrical wall in the path of said flat, diverging spray of fuel from said impingement fuel injector.

2. The gas turbine engine as defined by claim 1 wherein said cylindrical wall of said combustor is an outer wall and said fuel impingement injector is mounted in said outer wall in circumferentially spaced relation to said igniter.

3. The gas turbine engine as defined by claim 1 wherein said impingement surface is defined by a finger facing said orifice at an acute angle to direct said flat, diverging spray of fuel toward said igniter.

4. The gas turbine engine as defined by claim 1 wherein said impingement fuel injector includes a barrel terminating in said discharge orifice with fuel being discharged therefrom at an acute angle to said impingement surface.

5. A gas turbine engine, comprising:
   a rotary compressor;
   a turbine wheel coupled to said compressor for driven movement thereof;
   an annular nozzle proximate said turbine wheel for directing gases of combustion thereat;
   an annular combustor defining an annular combustion spaced disposed about said turbine wheel and in fluid communication with both said compressor and said nozzle, said combustor having a cylindrical wall having ignition means associated therewith, said combustor receiving fuel from a source and air from said compressor and combusting fuel and air in said combustion space to generate said gases of combustion; and
   at least one impingement start fuel injector for injecting fuel from said source into said combustor, said impingement start fuel injector comprising at least one discharge orifice and means defining an impingement surface within said combustor in the path of fuel discharged from said orifice and at an angle thereto so as to produce a flat, diverging spray of fuel in a direction generally circumferentially about and tangential to said combustion space, said ignition means being positioned in said cylindrical wall in the path of said flat, diverging spray of fuel from said impingement start fuel injector.

6. The gas turbine engine as defined by claim 5 including a tangential fuel/air injector intermediate said impingement start fuel injector and said ignition means, said tangential fuel/air injector directing a spray of fuel and air generally tangentially of said combustion space, said tangential fuel/air injector producing a circumferential swirl of fuel and air in said combustion space to be ignited by said ignition means.

7. A gas turbine engine, comprising:
   a rotary compressor;
   a turbine wheel coupled to said compressor for driven movement thereof;
   an annular nozzle proximate said turbine wheel for directing gases of combustion thereat;
   an annular combustor defining an annular combustion space disposed about said turbine wheel and in fluid communication with both said compressor and said nozzle, said combustor having a cylindrical wall having ignition means associated therewith, said combustor receiving fuel from a source and air from said compressor and combusting fuel and air in said combustion space to generate said gases of combustion; and
   a plurality of fuel injectors including at least one impingement start fuel injector for injecting fuel from said source into said combustor, said impingement start fuel injector comprising at least one discharge orifice and means defining an impingement surface within said combustor and spaced from said orifice while in the path of fuel discharged from said orifice and located so as to cause fuel discharged from said orifice to be in a flat, diverging spray in a direction generally circumferentially about and tangential to said combustion space, said ignition means being positioned in said cylindrical wall in the path of said flat, diverging spray of fuel from said impingement start fuel injector.

8. The gas turbine engine as defined by claim 7 wherein said cylindrical wall comprises an outer wall spaced radially outwardly of an inner wall of said combustor, said ignition means comprising an igniter mounted in said outer wall of said combustor, said impingement start fuel injector also being mounted in said outer wall of said combustor in circumferentially spaced relation to said igniter.

9. The gas turbine engine as defined by claim 8 including a tangential fuel/air injector intermediate said impingement start injector and said ignition means, said tangential fuel/air injector directing a spray of fuel and air generally tangentially of said combustion space, said tangential fuel/air injector producing a circumferential swirl of fuel and air in said combustion space to be ignited by said igniter.

10. The gas turbine engine as defined by claim 7 wherein said means defining an impingement surface comprises a finger having a generally planar impingement surface facing said orifice to direct said flat, diverging spray of fuel toward said igniter, said impingement start fuel injector including a barrel terminating in said discharge orifice and said finger being mounted at an acute angle in spaced relation to said discharge orifice.

11. The gas turbine engine as defined by claim 7 wherein said turbine wheel defines a rotational axis and said impingement surface is generally planar and parallel to said axis, said discharge orifice opening radially inwardly of said combustor and being relatively short to provide optimum atomization.

* * * * *